J. HEIM.
VARIABLE SPEED GEARING.
APPLICATION FILED AUG. 1, 1908.
929,425.
Patented July 27, 1909
2 SHEETS—SHEET 1
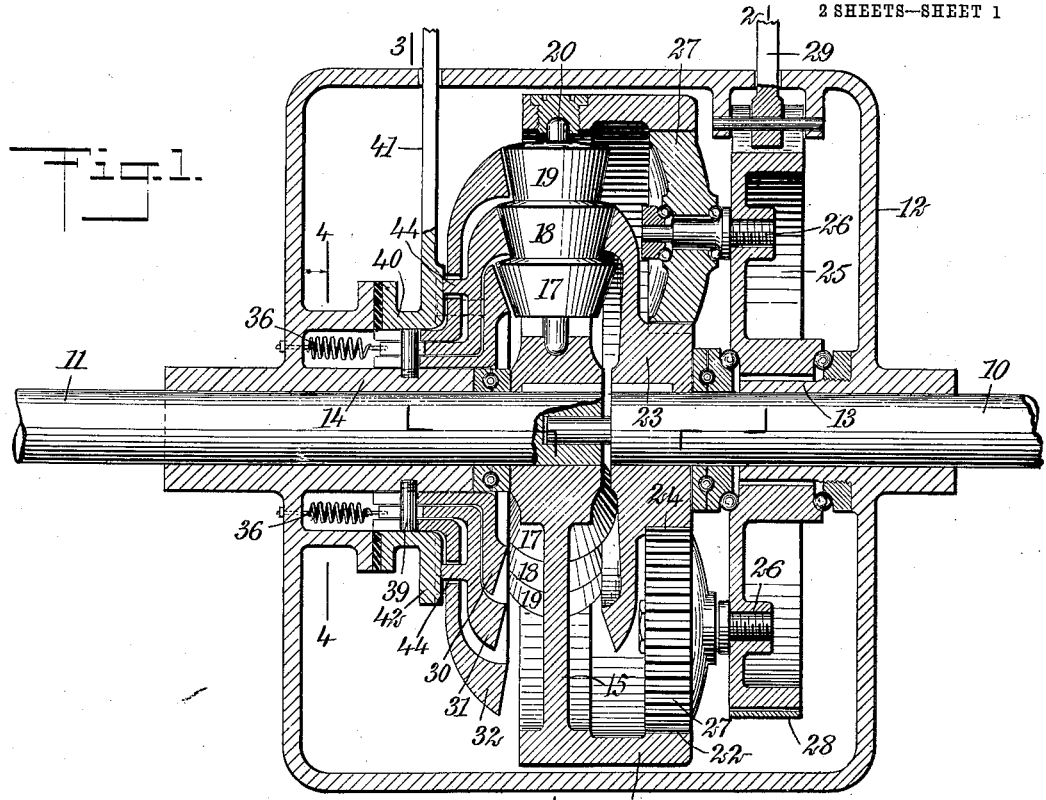
Fig. 1.
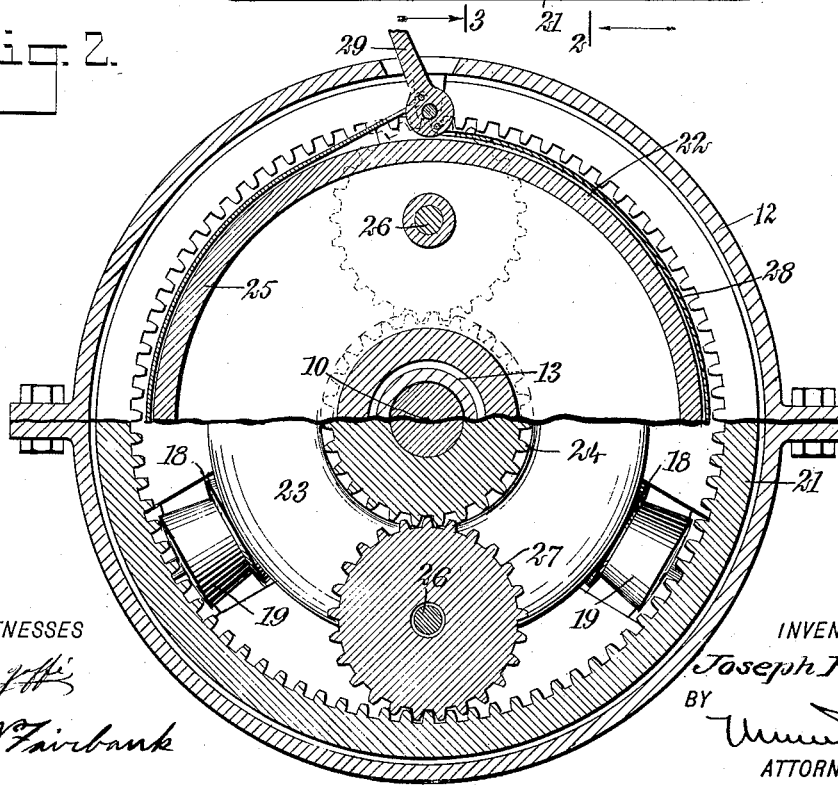
Fig. 2.
WITNESSES
INVENTOR
Joseph Heim
BY
ATTORNEYS

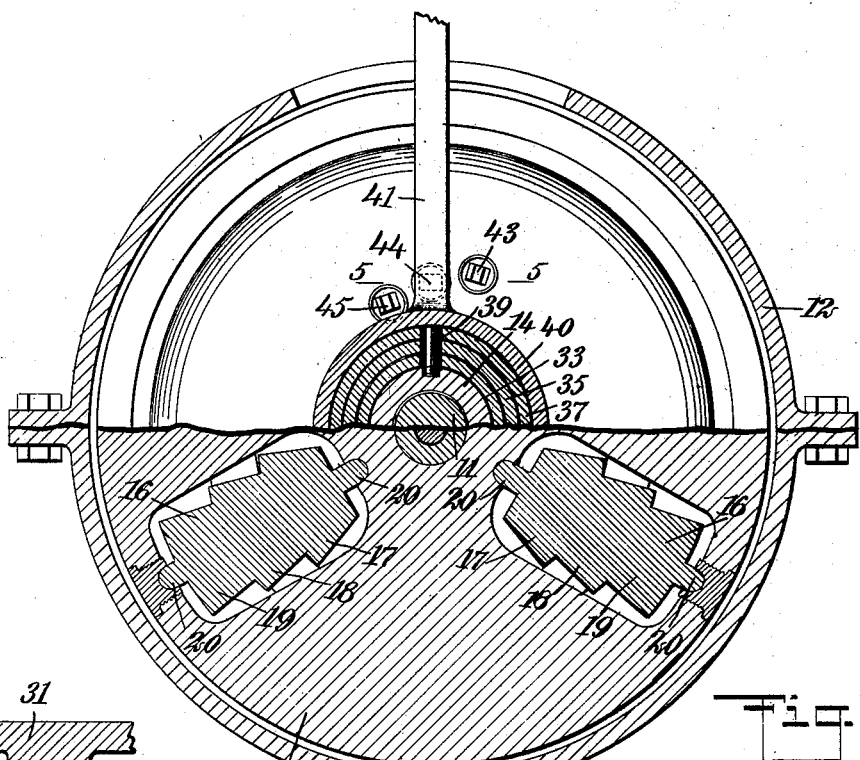
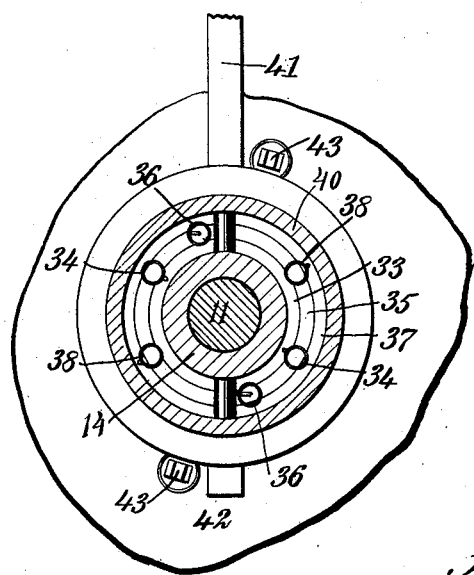

UNITED STATES PATENT OFFICE.

JOSEPH HEIM, OF WINNIPEG, MANITOBA, CANADA.

VARIABLE-SPEED GEARING.

No. 929,425.  Specification of Letters Patent.  Patented July 27, 1909.

Application filed August 1, 1908. Serial No. 446,407.

*To all whom it may concern:*

Be it known that I, JOSEPH HEIM, a subject of the King of Great Britain, and a resident of Winnipeg, in the Province of Manitoba, Dominion of Canada, have invented a new and Improved Variable-Speed Gearing, of which the following is a full, clear, and exact description.

This invention relates to certain improvements in variable speed gearing, and more particularly to that type of gearing in which a driving shaft and a driven shaft are provided, together with mechanism whereby the driven shaft may be rotated at any one of a plurality of different speeds forward or at at least one speed in the reverse direction.

The principal object of my invention is to provide a plurality of non-rotatable gear members, any one of which may be brought into engagement with a rotatable gear member to cause a rotation of the latter as it moves bodily along the face of said stationary member.

A further object of my invention is to provide a member carrying a plurality of pinions which serve for the transmission of power only when the driven shaft is to be rotated in the reverse direction.

Reference is to be had to the accompanying drawings, forming a part of this specification, in which similar characters of reference indicate corresponding parts in all the figures, and in which—

Figure 1 is a longitudinal section through a gearing constructed in accordance with my invention.; Fig. 2 is a transverse section on the line 2—2 of Fig. 1; Fig. 3 is a transverse sec'.on on the line 3—3 of Fig. 1; Fig. 4 is a transverse section on the line 4—4 of Fig. 1; and Fig. 5 is a detail sectional view on the line 5—5 of Fig. 3 showing the mechanism for operating the non-rotatable friction disk.

In the specific form of my gearing illustrated in the accompanying drawings, I provide a driving shaft 10 and a driven shaft 11, in alinement with each other and having their adjacent ends and the gearing adjacent thereto, inclosed by a suitable casing 12. The casing is provided with inwardly-directed bearing sleeves 13 and 14, which receive the two shafts and serve as supports, as hereinafter set forth. At the inner end of the driven shaft, there is mounted a wheel 15, having a plurality of radially-disposed rotatable members 16. Each member is in the form of a plurality of cones 17, 18 and 19, in alinement with each other, and at the outer ends of the cones are studs 20, serving as bearings. The inner stud of each member 16 is mounted adjacent the hub of the wheel 15, while the outer stud is mounted adjacent the periphery. The wheel carries a peripheral flange 21, having interior gear teeth 22 adjacent its free edge.

Rigidly secured to the driving shaft 10 and adjacent the end thereof, I provide a member or disk 23, presenting a conical surface in engagement with the surface of one of the several cones 17, 18 and 19. As illustrated, there are provided three of the members 16 and the conical face of the member 23 engages with the central cone 18 of each member. The member 23 is also provided with exterior gear teeth 24 lying in the same plane as the gear teeth 22 and concentric therewith.

Freely rotatable on the sleeve 13 of the casing and held against longitudinal movement in any suitable manner, as for instance, by ball-bearings, I provide a drum 25, having a plurality of stub shafts 26 extending out from the surface thereof substantially parallel to the driving shaft 10. On each of these stub shafts, there is rotatably mounted a gear wheel 27, the periphery of which is in engagement not only with the gear teeth 24, but also the gear teeth 22. The pinions 27 being free to rotate about their own axes and the drum carrying these axes being free to rotate about the sleeve 13, they normally do not in any way interfere with the free movement of the wheel 15 in respect to the member 23. Encircling the drum 25 is a brake band 28, the opposite ends of which are connected to a lever 29 pivoted to the casing 12. By moving the lever 29, the brake band may be tightened about the drum 25 and the latter may be positively held against rotation. The stub shafts 26 remain stationary and the rotation of the wheel 15 must bear a definite relationship to the rotation of the member 23. With the drum 25 held stationary, the driven shaft will rotate in the reverse direction to that of the driving shaft.

Mounted on the sleeve 14 of the casing and non-rotatable in respect thereto, I provide selective brake mechanism in the form of three concentric conical disks 30, 31 and 32. Each of the these disks has a corresponding sleeve portion serving as a bearing, and each is free to move longitudinally a limited distance. The conical surfaces of the three disks come adjacent the surfaces of the several cones of the members 16, but they are normally held out of engagement by the action of suitable springs. The bearing sleeve 33 of the innermost disk 30 is drawn back by suitable springs 34, to hold this disk out of engagement with the cones 17. The sleeve 35 of the disk 31 is held back by the springs 36, and the sleeve 37 of the outer disk 32 is held back by the springs 38. Each of the sleeves is provided with a slot, and through all of the adjacent slots, pins 39 extend outwardly from the sleeve 14 to prevent the sleeves and disk from rotating. Rotatably mounted upon the outer sleeve 37, is a collar 40, having a lever arm 41 extending out through a slot in the periphery of the casing. Diametrically opposite to the lever arm 41 is a radially-disposed lug 42, similar to the base of the lever. Each of the disks is provided with one or more cam lugs adapted to be engaged by the lever 41 or the lug 42 to force the disk longitudinally against the action of its spring. The outer disk is provided with two oppositely-disposed lugs 43, the intermediate disk is provided with two lugs 44 extending through apertures in the outer disk, and the inner disk is provided with two lugs 45 extending through apertures in the intermediate and outer disks. The lugs of each disk are a different distance from the center than the lugs of any other disk, and all of the lugs are adjacent to and in the path of the lever 41 and of the diametrically opposite lug 42 of the collar. Moving the lever 41 to bring it into engagement with the lugs of any disk, forces that disk longitudinally to bring the conical surface thereof into engagement with the corresponding cone of the member 16.

With the parts in the position shown in the drawings, the lever is opposite to the lug 44 of the intermediate disk, and that disk is forced longitudinally to bring its conical surface into engagement with the cones 18. The driving shaft through the member 23, causes the cones 18 to rotate about their own axes, but by bringing any one of the disks 30, 31 or 32 into engagement with the member 16, the cones are prevented from rotating on their axes, except by rolling along the surface of the stationary disk. The bodily movement of the cones about the shaft 11 causes a rotation of the latter as the cones are journaled in the wheel 15, which is keyed to the shaft 11. Different speeds may be attained by moving different disks into engagement with the several cones of the member 16.

In the specific form illustrated, the cones 17, 18, and 19, and the conical disks 23, 30, 31 and 32, are shown with smooth faces, but it is evident that they serve as gear members, and the surfaces may, if desired, be provided with gear teeth.

Having thus described my invention, I claim as new and desire to secure by Letters Patent:

1. In a gearing, the combination of a driving shaft, a driven shaft, a disk secured to one of said shafts, a rotatable member carried by the other of said shafts and having its axis of rotation radially disposed in respect thereto, a non-rotatable disk, said rotatable member being normally in engagement with one of said disks, and means for effecting the engagement of said rotatable member with the other disk.

2. In a gearing, the combination of a shaft, a rotatable member carried thereby and having its axis of rotation radially disposed in respect to said shaft, controllable means on which said member is adapted to roll, a second shaft, and means carried thereby and having operative engagement with said member.

3. In a gearing, the combination of a driving disk having a conical face, a driven shaft, a cone carried thereby with its axis radially disposed in respect to said shaft and in engagement with the surface of said disk, and a non-rotatable disk concentric with said shaft and movable longitudinally into engagement with said cone.

4. In a gearing, the combination of a driving member and a driven member, one of said members including a shaft and a conical-faced disk carried thereby, the other of said members comprising a shaft and a plurality of cones rigid in respect to each other and in axial alinement and radially disposed in respect to said shaft, a plurality of non-rotatable conical-faced disks independent of each of said members, and selective means for moving any one of said disks axially to bring it into engagement with a corresponding one of said cones.

5. In a gearing, the combination of a driving shaft, a driven shaft, a member carried by one of said shafts and having an internal gear and a plurality of radially-disposed rotatable members, an external gear concentric with said internal gear and secured to the other of said shafts, said external gear being operatively connected to the other shaft through the medium of said radially-disposed rotatable members, controllable means on which said radially-disposed rotatable members are adapted to roll; a drum unattached to either of said shafts, a plurality of gears carried thereby and in mesh with said external gear and said internal gear, and means for locking said drum against rotation.

In testimony whereof I have signed my name to this specification in the presence of two subscribing witnesses.

JOSEPH HEIM.

Witnesses:
HARRY J. BIRKETT.
ERWIN HEIM.